(12) United States Patent
Reynolds

(10) Patent No.: US 6,848,000 B1
(45) Date of Patent: Jan. 25, 2005

(54) SYSTEM AND METHOD FOR IMPROVED HANDLING OF CLIENT STATE OBJECTS

(75) Inventor: William Robert Reynolds, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 790 days.

(21) Appl. No.: 09/735,593

(22) Filed: Nov. 12, 2000

(51) Int. Cl.[7] .................. G06F 15/173; G06F 15/16
(52) U.S. Cl. ............ 709/226; 709/203; 709/224; 709/225; 709/227
(58) Field of Search ........................... 709/200, 205, 709/229, 203, 225, 226, 227; 719/105

(56) References Cited

U.S. PATENT DOCUMENTS

| | | | | |
|---|---|---|---|---|
| 5,404,534 A | * | 4/1995 | Foss et al. | 719/315 |
| 5,870,546 A | * | 2/1999 | Kirsch | 709/205 |
| 5,935,210 A | * | 8/1999 | Stark | 709/224 |
| 5,961,601 A | * | 10/1999 | Iyengar | 709/229 |
| 6,170,017 B1 | * | 1/2001 | Dias et al. | 709/235 |
| 6,185,598 B1 | * | 2/2001 | Farber et al. | 709/200 |
| 6,374,300 B2 | * | 4/2002 | Masters | 709/229 |
| 6,542,964 B1 | * | 4/2003 | Scharber | 711/122 |
| 6,782,423 B1 | * | 8/2004 | Nakayama et al. | 709/224 |

\* cited by examiner

Primary Examiner—Bharat Barot
Assistant Examiner—Kevin Bates
(74) Attorney, Agent, or Firm—Van Leeuwen & Van Leeuwen; Joseph T. Van Leeuwen; Diana L. Roberts

(57) ABSTRACT

A client state object, such as a "cookie," allows a server to save client state information on the client. This information is returned when the client requests information from the server. A server includes two identifiers—a primary name and an alternate name. Web pages on the server are modified so that links to server resources, such as files, that need client state information reference the primary name, while other links that do not need client state information reference the alternate name. In this manner, it does not matter which directory on the server is used to store files and files can be intermingled with one another regardless of whether the individual files use client state information. A method is provided for modifying existing web pages based on whether server resources addressed by the hyperlinks use client state information.

16 Claims, 5 Drawing Sheets

SYSTEM AND METHOD FOR IMPROVED HANDLING OF CLIENT STATE OBJECTS

BACKGROUND OF THE INVENTION

1. Technical Field

The present invention relates in general to a method and system for improving an Internet server's handling of client state objects. More particularly, the present invention relates to a system and method reducing the amount of unnecessary state object, or "cookie," traffic between a client computer and the server computer.

2. Description of the Related Art

Some Internet web sites (i.e., servers) store client state information in a small text file, sometimes called a "cookie," on the client's (i.e., user's) hard drive or in memory located on the client computer. Internet Browsers, such as Microsoft's Internet Explorer™ and Netscape's Navigator™, are often set up to allow the creation of these state objects. The user, however, can specify that a prompt be provided before a web site puts a state object on the user's hard disk or memory. In this manner, the user can choose to accept or reject state objects. The user can also configure the browser to prevent the acceptance of any state objects.

State objects are small data structures used by a web site to deliver data to a web client and store the data on the client's hard drive or memory. In certain circumstances, the client returns the information to the web site. Web sites can thus "remember" information about users to facilitate their preferences for a particular site. The web site may deliver one or more state objects to the client which are stored as flat files on the client's local hard drive or memory.

State objects contain information about the user and his or her preferences. For example, if the user inquires about a flight schedule at an airliner's Web site, the site might create a state object (i.e., a cookie) that contains the user's itinerary. Or it might only contain a record of which pages within the site the user visited, in order to help the site customize the view for the user during subsequent visits to the web site.

Only the information provided by the user or choices made by the user while visiting a Web site can be stored in a state object. For example, the web site cannot determine the user's e-mail name unless the user provides it. Allowing a Web site to create a state object, or cookie, on the client's computer does not give the web site, or any other web site, access to the rest of the client computer. In addition, only the site that created the state object is able to read it.

State objects are a general mechanism which server side connections (i.e., web sites) can use to both store and retrieve information on the client (i.e., user) side of the connection. The addition of a simple, persistent, client-side state significantly extends the capabilities of Web-based client/server applications. Web sites use state objects to simulate a continuous connection to the web site. This makes it more convenient for users by allowing them to visit pages within a site without having to reintroduce themselves with each mouse click.

HyperText Transfer Protocol (HTTP), is the underlying protocol used by the World Wide Web. HTTP defines how messages are formatted and transmitted, and what actions Web servers and browsers take in response to various commands. For example, when a user enters a URL (Uniform Resource Locator—the global address of documents and other resources on the World Wide Web) in a browser, an HTTP command is sent to the Web server directing it to fetch and transmit the requested Web page. The current HTTP protocol is "stateless," meaning that the server does not store any information about a particular HTTP transaction; each connection between a client and a server is "fresh" and has no knowledge of any previous HTTP transactions. "State" information is information about a communication between a client and a server. In some cases it is useful to maintain state information about the user across multiple HTTP transactions.

When returning an HTTP object or other network information to a client, a server may include a piece of state information which is stored by the client. Included in that state object is a description of the range of URLs for which that state is valid. Any future requests made by the client which fall in that URL range will include a transmittal of the current value of the state object from the client back to the server. As described above, the state object is often called a "cookie," for no compelling reason.

This simple mechanism provides a powerful tool which enables a host of applications to be written for web-based environments. Shopping applications can store information about currently selected items, for fee services can send back registration information and free the client from retyping a user-id on subsequent connections, and web sites can store per-user preferences on the client computer. These preferences can be automatically supplied by the client computer when the client subsequently connects to the server.

A cookie is introduced to the client by including a "Set-Cookie" header as part of an HTTP response; often this will be generated by a CGI script. CGI stands for "Common Gateway Interface," a specification for transferring information between a World Wide Web server and a CGI program. A CGI program is any program designed to accept and return data that conforms to the CGI specification. The program,.could be written in any programming language, including C, Perl, Java, or Visual Basic.

Syntax of the Set-Cookie HTTP Response Header

This is the format a CGI script would use to add to the HTTP headers a new piece of data which is to be stored by the client for later retrieval.

Set-Cookie: NAME=VALUE; expires=DATE;
  path=PATH; domain=DOMAIN_NAME; secure
  Multiple Set-Cookie headers can be issued in a single server response.

NAME=VALUE

This string is a sequence of characters excluding semicolon, comma and white space. This is the only required attribute on the Set-Cookie header.

expires=DATE

The expires attribute specifies a date string that defines the valid life time of that cookie. Once the expiration date has been reached, the cookie will no longer be stored or given out. Expires is an optional attribute. If not specified, the cookie will expire when the user's session ends.

The expires header lets the client know when it is safe to purge the mapping but the client is not required to do so. A client may also delete a cookie before its expiration date arrives, for example if the number of cookies exceeds its internal limits.

domain=DOMAIN NAME

When searching the cookie list for valid cookies, a comparison of the domain attributes of the cookie is made with the Internet domain name of the host from which the URL will be fetched. If there is a tail match, then the cookie will go through "path matching" to see if it should be sent (see description of "path," below). "Tail matching" means that the domain attribute is matched against the tail of the fully qualified domain name of the host. A domain attribute of "acme.com" would therefore match host names "anvil.acme.com" as well as "shipping.crate.acme.com". The default value of domain is the host name of the server which generated the cookie response.

Only hosts within the specified domain can set a cookie for a domain. Domains that store cookies have at least two (2) or three (3) periods in them to prevent domains of the form ".com", ".edu", and "va.us" from storing overly-broad cookies. Any domain that falls within one of the special top level domains (e.g., ".COM", ".EDU", ".NET", ".ORG", ".GOV", ".MIL", and ".INT") requires at least two periods. Any other domain requires at least three periods.
path=PATH The path attribute is used to specify the subset of URLs in a domain for which the cookie is valid. If a cookie has already passed domain matching, then path matching takes place wherein the pathname component of the URL is compared with the path attribute. If there is a prefix match, the cookie is considered valid and is sent along with the URL request. The path "/foo" would match "/foobar" and "/foo/bar.html". The path "/" is the most general path and matches any path within the domain.

If the path is not specified, it as assumed to be the same path as the document being described by the header which contains the cookie. Setting the path to a higher-level value does not override other more specific path mappings. If there are multiple matches for a given cookie name, but with separate paths, all the matching cookies will be sent (see examples below). Instances of the same path and name will overwrite each other, with the latest instance taking precedence. Instances of the same path but different names will add additional mappings. When sending cookies to a server, all cookies with a more specific path mapping should be sent before cookies with less specific path mappings. For example, a cookie "name1=foo" with a path mapping of "/" should be sent after a cookie "name1=foo2" with a path mapping of "/bar" if they are both to be sent.
secure If a cookie is marked secure, it will only be transmitted if the communications channel with the host is a secure one. Currently this means that secure cookies will only be sent to HTTPS (HTTP over SSL) servers. If secure is not specified, a cookie is considered safe to be sent in the clear over unsecured channels.
Syntax of the Cookie HTTP Request Header When requesting a URL from an HTTP server, the browser will match the URL against all cookies and if any of them match, a line containing the name/value pairs of all matching cookies will be included in the HTTP request. Here is the format of that line:

Cookie: NAME1=OPAQUE_STRING1; NAME2=OPAQUE$_{13}$ STRING2 . . .

There are limitations on the number of cookies that a client can store at any one time.

If a CGI script wishes to delete a cookie, it can do so by returning a cookie with the same name, and an expires time which is in the past. The path and name should match exactly in order for the expiring cookie to replace the valid cookie. This requirement makes it difficult for anyone but the originator of a cookie to delete a cookie.

When caching HTTP, as a proxy server might do, the Set-cookie response header should never be cached. If a proxy server receives a response which contains a Set-cookie header, it should propagate the Set-cookie header to the client, regardless of whether the response was 304 (Not Modified) or 200 (OK). Similarly, if a client request contains a Cookie: header, it should be forwarded through a proxy, even if the conditional If-modified-since request is being made.

EXAMPLES

Below are sample exchanges which illustrate the use of cookies:

First Example Transaction Sequence

1. Client requests a document, and receives in the response:
   Set-Cookie: CUSTOMER=WILE_E_COYOTE; path=/; expires=Wednesday, 09-Nov-99 23:12:40 GMT
2. When client requests a URL in path g/" on this server, it sends:
   Cookie: CUSTOMER=WILE$_E$_COYOTE
3. Client requests a document, and receives in the response:
   Set-Cookie: PART_NUMBER=ROCKET_LAUNCHER_0001; path=/
4. When client requests a URL in path "/" on this server, it sends:
   Cookie: CUSTOMER=WILE_E_COYOTE; PART_NUMBER=ROCKET_LAUNCHER_0001
5. Client receives:
   Set-Cookie: SHIPPING=FEDEX; path=/foo
6. When client requests a URL in path "/" on this server, it sends:
   Cookie: CUSTOMER=WILE_E_COYOTE; PART_NUMBER=ROCKET_LAUNCHER_0001
7. When client requests a URL in path "/foo" on this server, it sends:
   Cookie: CUSTOMER=WILE_E_COYOTE; PART_NUMBER=ROCKET_LAUNCHER_0001; SHIPPING=FEDEX Second Example Transaction Sequence
(Assume all mappings from above have been cleared.)

1. Client receives:
   Set-Cookie: PART_NUMBER=ROCKET_LAUNCHER_0001; path=/
2. When client requests a URL in path "/" on this server, it sends:
   Cookie: PART_NUMBER=ROCKET_LAUNCHER_0001
3. Client receives:
   Set-Cookie: PART_NUMBER=RIDING_ROCKET_0023; path=/ammo
4. When client requests a URL in path "/ammo" on this server, it sends:
   Cookie: PART_NUMBER=RIDING_ROCKET_0023; PART_NUMBER=ROCKET_LAUNCHER_0001

NOTE: There are two name/value pairs named "PART_NUMBER" due to the inheritance of the "/" mapping in addition to the "/ammo" mapping.

As illustrated above, a client computer has no way of determining whether a server actually needs a state object, such as a cookie. The browser, therefore, sends state object information to the server so long as the domain and path information matches. Because the current HTTP protocol is stateless, the state object must be included in all requests to the server regardless of whether the server needs the information. One challenge, therefore, in communicating state information is determining when a server actually needs the information.

When a client requests a file from a server, it contacts the server using an address of the file on the server. The address the client enters includes (1) the protocol to use (i.e., HTTP), (2) the server name (e.g., "acme.com"), and (3) the file name (or resource name) of the file being requested (e.g., "main.htm"). The browser communicates with a name server to translate the server name (e.g., www.acme.com) into an IP Address, which it uses to connect to that server machine. The browser then forms a connection to the Web server at that IP address on port 80. Following the HTTP protocol, the browser sends a GET request to the server, asking for the file "http://www.acme.com/main.htm". At this point, any matching state information stored on the client (i.e. cookies) are sent to the server. The server then sends the file (i.e. the HTML text corresponding to main.htm) back to the browser. The server may also include state information in its response that is stored on the client. In the case of an HTML file, the browser reads the HTML tags and formats the page on the client's screen.

This process of the client making GET requests and the server responding with data often occurs many times. Every time the user clicks on a hyperlink, the client issues a GET request and the server responds. Including state information with each GET request and response adds to the amount of data that are transmitted and processed by both the client and the server. Often, the state information is sent even though it is not needed for a particular GET request.

As discussed above, path mechanism can be used to more particularly indicate which location within a server corresponds with the state object. Unfortunately, many server web applications are not structured so that they can readily use the path mechanism. For example, in many web servers' directory structures content that needs the state object is intermingled with content that does not need the state object. Another challenge is changing web pages to reduce the amount of state object information being transmitted without overly disrupting the content and organization of the server.

What is needed, therefore, is a way to reduce the amount of state object information transmissions between a client and server. Furthermore, what is needed is a way to reduce such transmissions by making minor changes to the web server that do not overly disrupt the content and organization of the server.

SUMMARY

It has been discovered that traffic between a server and a client can be improved by reducing the amount of client state information and server "set cookie" requests sent between the machines. The server resides in a domain and has two names that address the server. A "name alias" refers to two different names within the same domain (e.g., x.ibm.com and y.ibm.com). Another type of alternate name that can be used is a "domain alias" which refers to a registered name and a registered alias name (e.g., ibm.com and ibm_alias.com) that map to the same server. An "alternate name" can be either a name alias or a domain alias. Web pages served by the server can contain a variety of links to other files located on the server. If a particular file needs to set client state information (i.e., a "SET COOKIE" instruction) or receive client state information from the client, one of the server names is used to send the SET COOKIE request.

On the other hand, if a particular file does not need to set or receive client state information, the other, or alternate, name is used to address the file. Because files using the alternate name do not set or receive client state information, efficiency in transmitting and processing these files is improved.

In addition, existing web pages can be more easily modified to take advantage of the transmission and processing efficiencies. An existing web page is analyzed to determine whether links (i.e., hyperlinks) reference files that need client state information. If the files do not need client state information, the hyperlink is modified to point to the alternate rather than the regular, or primary, name. When the client uses the modified web page and selects a hyperlink that has been modified to address the alternate name, no corresponding client state information (i.e., a cookie file) is found, thus eliminating the unnecessary transfer of client state information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
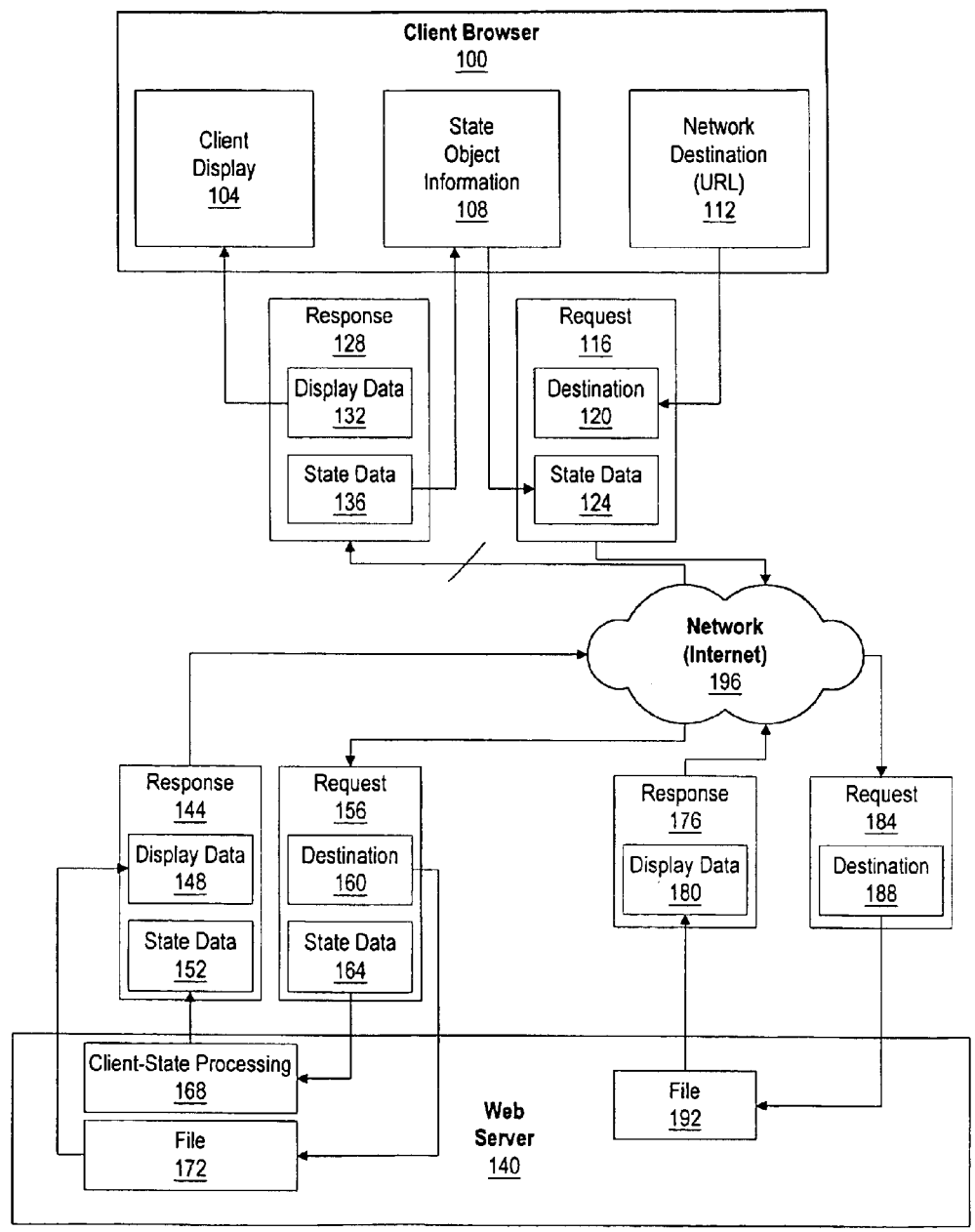
FIG. 1 is a network diagram showing the interaction between a client and a server.

FIG. 1 shows a network diagram of the interaction between a client and a. server. Client browser 100 includes client display 104 for displaying formatted browser content to the user. When the browser receives content, such as a HyperText Markup Language (HTML) file, the coded file is used to format the display area, including such things as graphics, frames, and animated images. Client state object information 108 includes previously stored information regarding the client. In one embodiment, client state object information 108 is stored in flat files called "cookies." Client browser 100 also includes network destination 112. Network destination 112 identifies a resource connected to computer network 196. One example of a computer network is the Internet. Network destination 112 includes user provided Uniform Resource Locators (URLs) entered as an "address" in client browser 100. Network destination 112 can also be provided by the user selecting a hyperlink on a web page being displayed in client display 104 or by the user selecting a previously stored destination address, such as a bookmark, from a list of addresses stored on the client computer.

When network destination 112 is provided, browser 100 checks state object information 108 to determine whether client state information should be passed to the destination web server along with the request. Request 116 includes destination 120 and, if appropriate, state information data 124 that corresponds with destination 120. Destination 120 includes a server address (i.e., ibm.com) and a resource, such as a filename, being requested (i.e., mainpage.htm). Request 116 is sent to computer network 196. Computer network passes the request onto web server 140.

In the example shown, web server 140 has been configured so that resources, such as files, that use client state information are addressed using the web server's primary name. A "name alias" refers to two different names within the same domain (e.g., x.ibm.com and y.ibm.com). Another type of alternate name that can be used is a "domain alias" which refers to a registered name and a registered alias name (e.g., ibm.com and ibm_alias.com) that map to the same server. An "alternate name" can be either a name alias or a domain alias. If there was state information corresponding with the address, request 156 is received by web server 140. In the example shown, request 156 would occur when the client addressed the server's primary name rather than the server's alternate name. Request 156 includes both destination 160 and client state data 164. Client state data 164 is processed by client state processing 168. If client state processing 168 determines that new or updated state information should be stored on the client, client state processing includes new state data 152 in response 144. Response 144 also includes display data 148 which is provided from web server file 172. Response 144 is transmitted through computer network 196 to client browser 100. Response 128 is received by the client from computer network 196. Display data 132 is read and displayed to the user in client display 104. Any state information (i.e. a "SET COOKIE" request), is read from state data 136 and included with state object information 108.

In the example shown, if destination 120 in client's request 116 pointed to the web server's alternate name, rather than the web server's primary name, request 116 would not include state data 124 because this alternate name is used as a means of separating destinations using client state information (i.e., the web server's primary name) from a destination that does not use client state information (the alternate name). In this manner, an existing web server page can be modified so that any links on the page that do not use client state information address the web server's alternate name. When the alternate name is selected by the user (i.e., by selecting a particular hyperlink appearing on the server's web page), no state information will be found because the alternate name does not appear in state object information 108. Request 116 will then only include destination 120. Destination 120 will include the alternate name of web server 140 and the file name being requested from the web server. Request 116 (without state data 124) is transmitted through computer network 196 and request 184 is received at web server 140. Request 184 includes destination 188, but does not include any state information from the client. While it is theoretically possible for the web server to include a cookie in a response from the alternate name, the web page and server application have been structured so that this does not occur. Response 176 includes display data 180 included from web server file 192. Response 176 is transmitted through computer network 196 and received at client browser 100. However, this response does not include any state data requests, so an association is never made between the web server's alternate name and any state object information.

Note that whether client state information is included in a request or response is determined by network destination 112 being requested by the client. In this manner, the same web server file can be used in conjunction with client state information or without. In the example shown, if the file is addressed using the web server's primary name, then client state information may be included. However, if the file is addressed using the web server's alternate name, then client state information is not included.

Figure 2:
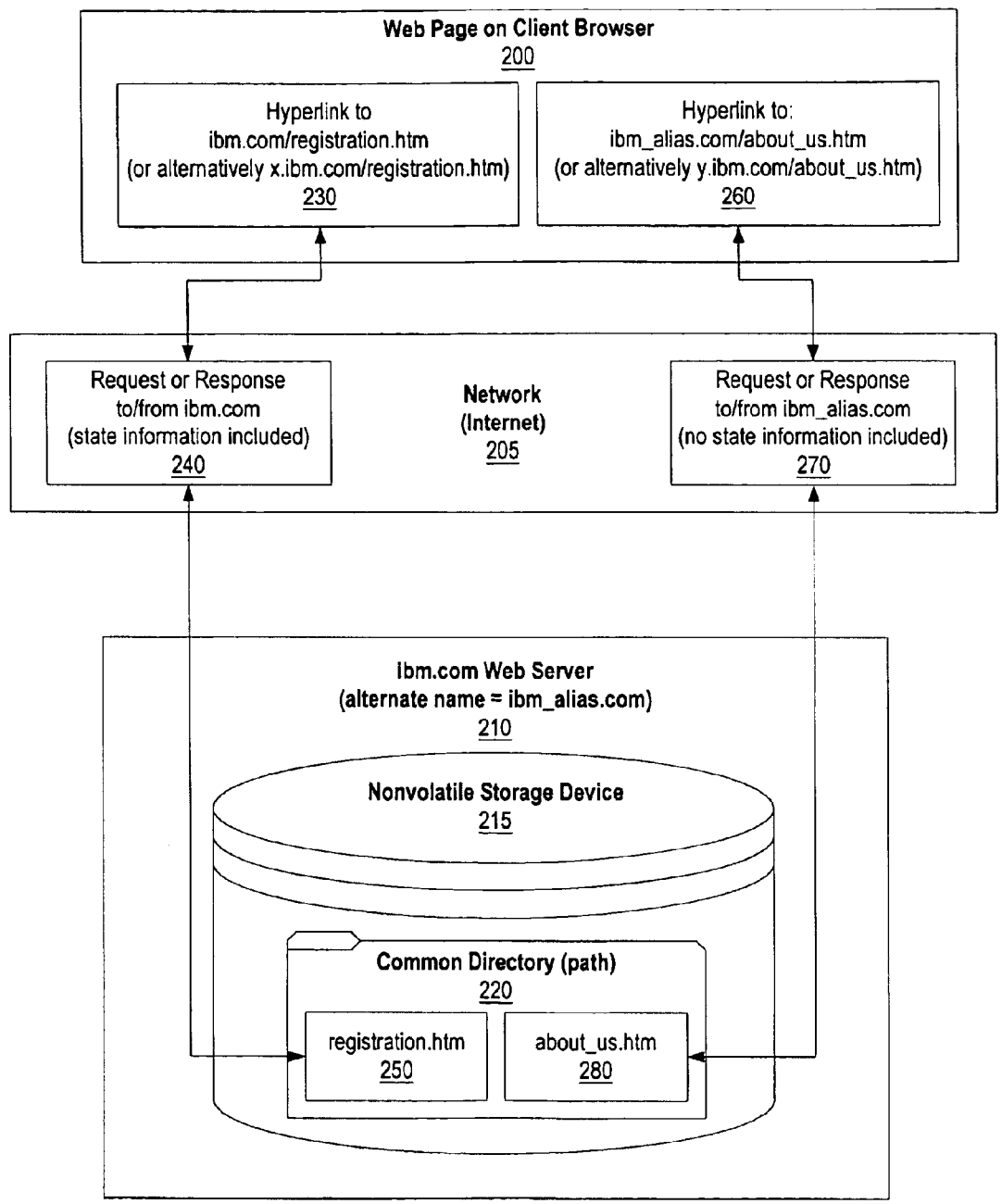
FIG. 2 is a block diagram showing requests and responses being processed by a server with two names.

FIG. 2 shows a block diagram of requests and responses being processed by a server with two names. Web page 200 appears on client's browser while the user is using the client computer system. In the example shown, web page 200 includes two hyperlinks. Hyperlink 230 includes the web server's primary name ("ibm.com") as part of the destination, while hyperlink 260 includes the web server's alternate name ("ibm_alias.com") as part of the destination. While the example shown uses a domain alias as the alternate name, in another implementation a name alias (such as the primary name being "x.ibm.com" and the alternate name being "y.ibm.com") could be used.

When hyperlink 230 is selected, state information is possibly included in request 240 (state information is supplied if the web site was previously visited and state information was retained on the client computer). Request 240 is transmitted through computer network 205 and received by web server 210. If web server 210 adds or modifies client state information, then the state information is included in return response 240. The requested file, "registration.htm" 250, is also included in response 240.

Hyperlink 260, on the other hand, addresses the web server's alternate name ("ibm_alias.com"). While an alternate name can map to client state information, the present invention identifies at least one alternate name that should not be used with client state information. In this fashion, changing a hyperlink on a web page to point to the alternate name, rather than the primary name, prevents client state information from being identified on the client. In addition, responses from the server to requests made to the server's alternate name should refrain from adding client state requests (i.e., "SET COOKIE"), in order to keep the alias name out of the client state information retained by the client. In this manner, transmission and processing efficiency can be improved on an existing web site simply by changing hyperlinks on the web page to point to the alternate, rather than the primary, name. A name server operating on network 205 translates the destination name into an IP address. Both the primary name and the alternate name map to the same IP address, or in other words, the same web server.

In the example shown, web page 200 includes hyperlink 260 which includes the alternate name as part of the destination. When the user selects hyperlink 260, request 270 is transmitted to web server 210 through computer network 205. The file included in hyperlink 260 is "about_us.htm". In response to request 270, web server 210 returns the contents of about_us.htm 280 in response 270 and refrains from including any requests to add any client state information. As shown, the files returned to the user are both stored in a common directory 220, on the same nonvolatile storage device 215, within the same physical web server 210.

Figure 3:
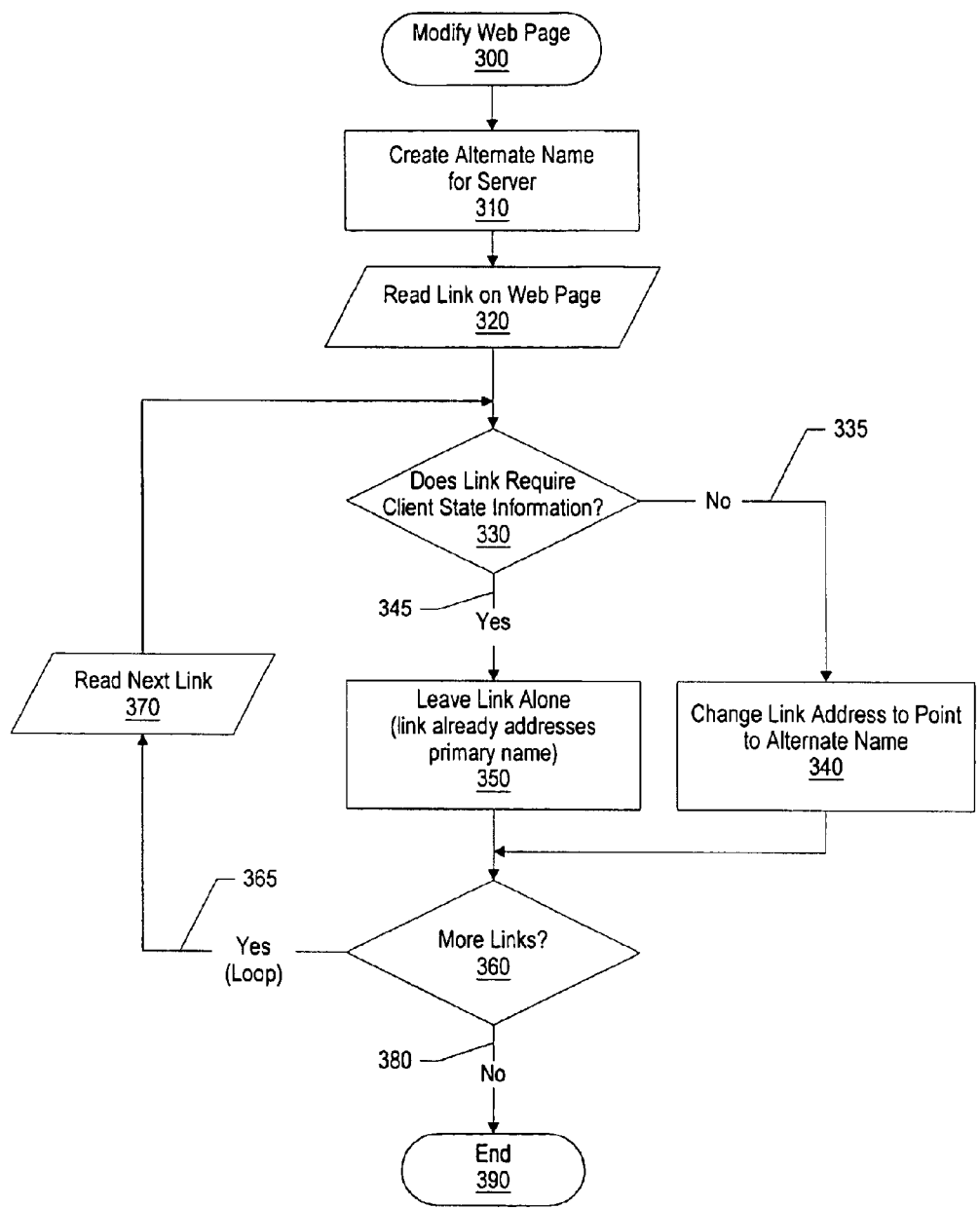
FIG. 3 is a flowchart showing the modification of hyperlinks in an existing web page.

FIG. 3 shows a flowchart of the modification of hyperlinks in an existing web page. A web page may exist in which all the links address the server's primary name. If the server uses client state information, unnecessary transmissions of such information may take place, especially if the client state information has been associated with the domain name and not segregated to a particular file or directory. The existing web page is modified to avoid unnecessary transmissions of this state information between the client and the server.

Processing commences at 300 whereupon an alternate name is created for the web server (step 310). If the alternate name is a domain alias (e.g., ibm_alias.com), it is included in lists processed by name servers on the computer network, such as the Internet, so that both the domain alias and the primary name point to the same IP address. If a name alias is used, then one of the names is used as a primary name (i.e., x.ibm.com) and the other is used as the name alias (i.e., y.ibm.com) with both names designed to translate to the same IP address.

A first link is read from the web page (input 320). A determination is made as to whether the link uses client state information (decision 330). The decision may be manual with a programmer analyzing the hyperlink, automated so that only links to certain known files use client state information, or semi-automated with a program reading the hyperlink and prompting a programmer or other user as to whether the link uses client state information. If the link does not use client state information, decision 330 branches to "no" branch 335 and the hyperlink address is modified so that the destination name is the alternate name rather than the primary name (step 340). On the other hand, if the link does use client state information, decision 330 branches to "yes" branch 345 whereupon the link is left alone (step 350) because it already points to the primary name. In the case where the hyperlink address already points to the alternate name, such as when the logic shown in FIG. 3 is performed multiple times, then the hyperlink address is checked to ensure that it addresses the primary name and, if it does not address the primary name, the destination is modified to address the primary, rather than the alternate, name.

A determination is made as to whether there are more hyperlinks on the web page to be analyzed (decision 360). If there are more hyperlinks, decision 360 branches to "yes" branch 365 which reads the next hyperlink information (input 370) and loops back to decision 330. This looping continues until no more hyperlinks need to be analyzed, in which case decision 360 branches to "nox branch 380 and processing terminates at 390.

Figure 4:
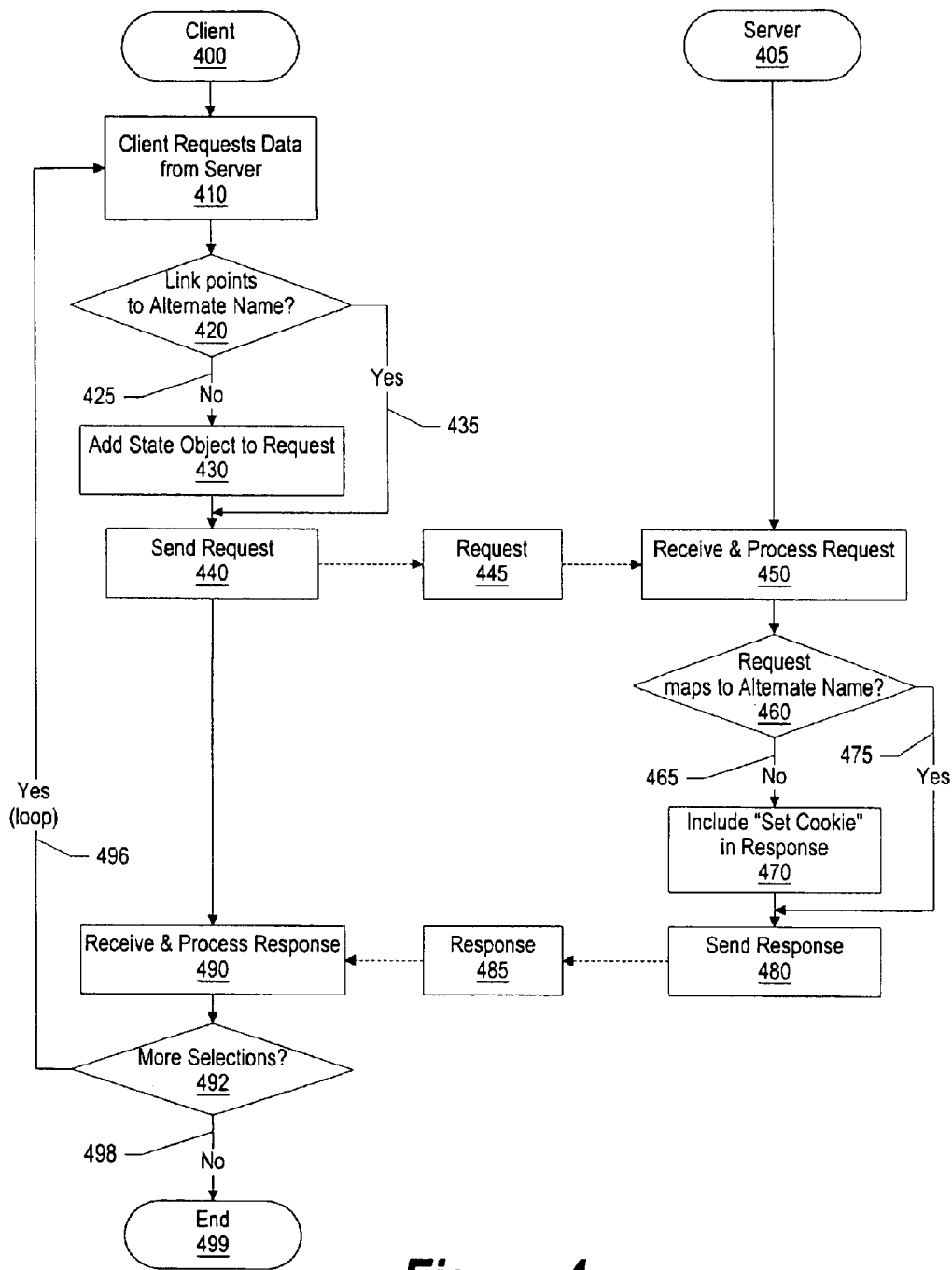
FIG. 4 is a flowchart showing requests sent to a server and responses received from the server wherein the requests and responses selectively use client state information.

FIG. 4 shows a flowchart of requests sent to a server and responses received from the server wherein the requests and responses selectively use client state information.

Client processing commences at 400 and server processing commences at 405. The client requests data from a server (step 410). The request can be an address entered in a browser, a stored address in a bookmark file, or an address encoded in a hyperlink on a displayed web page. A determination is made whether the link points to an alternate name (decision 420). The actual decision made is whether any client state information corresponds with the destination address because the client computer is generally unable to ascertain whether an address is for a primary name or an alternate name. However, the present invention keeps alternate name responses from making client state requests, so if the destination address is an alternate name there will not be any corresponding client state information. If the destination does not include an alternate name (i.e., the destination is the primary name), then decision 420 branches to "no," branch 425 whereupon any state information corresponding to the primary name is added to the request (step 430). On the other hand, if the link points to an alternate name, decision 420 branches to "yes" branch 435 and no state information is added to the request.

Request 445 is sent from the client (step 440) and received and processed by the server (step 450). If the destination address does not point to the server's alternate name, decision 460 branches to "no" branch 465 and any necessary client state updates are included with the response (step 470). On the other hand, if the destination address points to the server's alternate name, decision 460 branches to "yes" branch 475 and no client state requests are included in the response. Response 485 is sent by server (step 480) to the client whereupon the client receives and processes the response (step 490). A determination is made whether the client has more selections (decision 492). If the client has more selections, decision 492 branches to "yes" branch 496 which loops back to get the next request from the client. This looping continues until the client has no more requests, at which time decision 492 branches to "no" branch 498 and processing terminates at 499.

Figure 5:
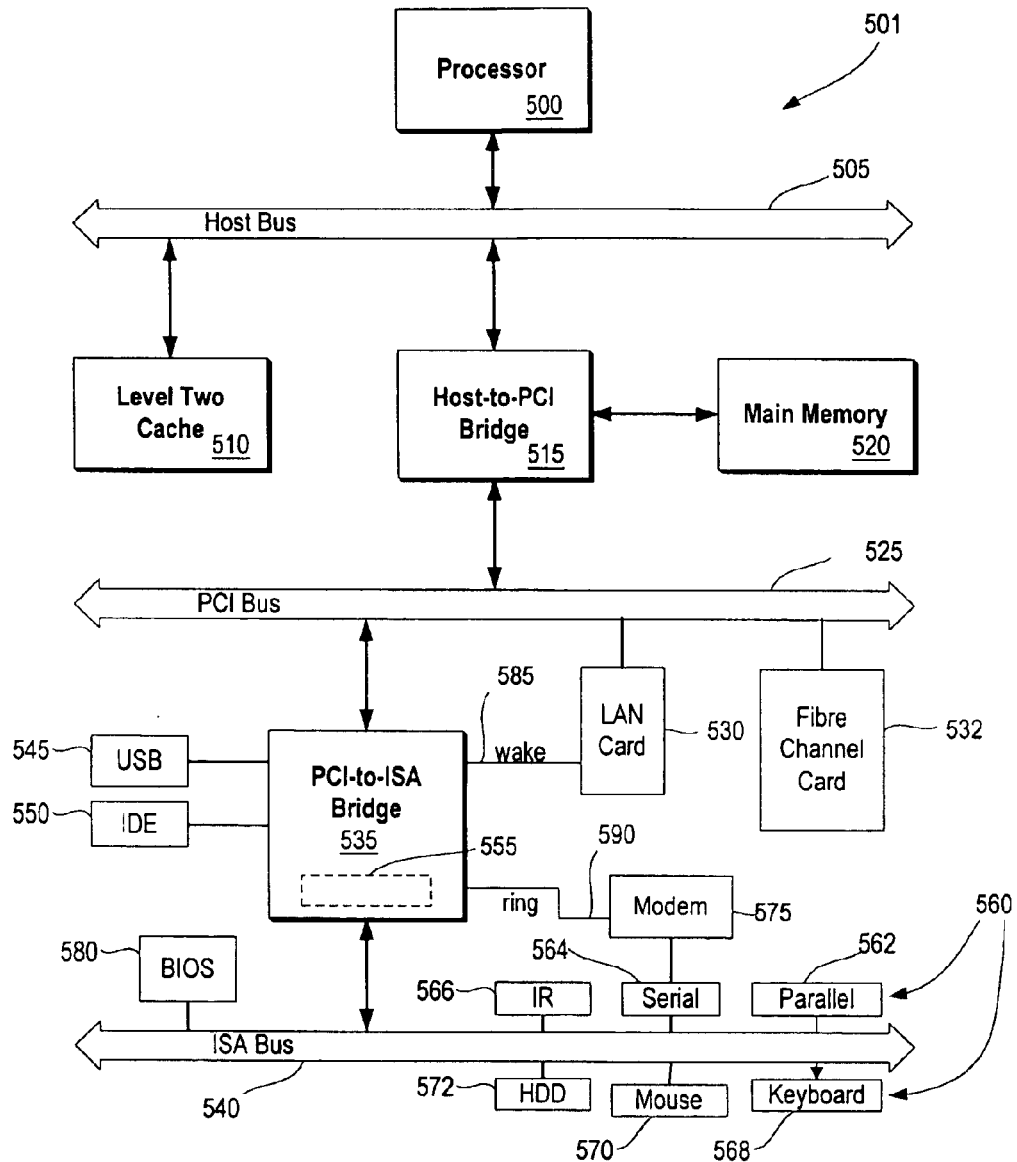
FIG. 5 is a block diagram of an information handling system capable of implementing the present invention.

FIG. 5 illustrates information handling system 501 which is a simplified example of a computer system capable of performing the server and client operations described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, and fixed disk (HDD) 572) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code)

in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of handling client state information, said method comprising:
   prior to receiving a first request from a client computer:
      analyzing a web page, the web page including one or more hyperlinks, wherein each hyperlink includes a server identifier and a resource identifier;
      determining whether the resource identifier corresponds to a server resource that uses client state information; and
      resetting the server identifier to a second server identifier in response to determining that the server resource does not require client state information;
      storing the resources and the web page with the reset server identifiers on a server, wherein the server identifier and second server identifier each identify the server;
   receiving the first request from the client computer for the web page;
   retrieving the stored web page with the reset server identifiers; and
   transmitting the retrieved web page to the client computer.

2. The method as described in claim 1 further comprising:
   setting the server identifier to a first server identifier in response to determining that the resource uses client state information.

3. The method as described in claim 1 wherein the client state information includes an Internet cookie.

4. The method as described in claim 1 further comprising:
   creating an alternate name for a server, wherein the server hosts the resources; and
   wherein the second identifier includes the alternate name.

5. The method as described in claim 4 wherein the server identifier includes a primary name for a server, wherein the server hosts the resources.

6. The method as described in claim 1 wherein the server resource includes one or more files.

7. A server comprising:
   one or more processors;
   a memory accessible by the processors;
   one or more nonvolatile storage devices accessible by the processors;
   a web page stored on one of the nonvolatile storage devices, the web page including:
      a plurality of hyperlinks that reference one or more resources each stored on one of the nonvolatile storage devices, wherein at least one of the resources uses client state information;
      a first server identifier included with each hyperlink corresponding with resources that use client state information; and
      a second server identifier included with each hyperlink corresponding with resources that do not use client state information;
      wherein the first and second server identifiers each identify the server
   a web page tool that creates the web page prior to receiving a first request from a client computer, the web page tool including:
      means for analyzing a web page, the web page including one or more hyperlinks, wherein each hyperlink includes a server identifier and a resource identifier;
      means for determining whether the resource identifier corresponds to a server resource that uses client state information; and
      means for setting the server identifier to a second server identifier in response to determining that the server resource does not require client state information;
      means for storing the resources and the web page with the reset server identifiers on a server, wherein the server identifier and second server identifier each identify the server;
   a web page delivery tool that provides the web page to the client computer, the web page delivery tool including:
      means for receiving the first request from the client computer for the web page;
      means for retrieving the stored web page with the reset server identifiers; and
      means for transmitting the retrieved web page to the client computer.

8. The server as described in claim 7 wherein the client state information includes an Internet cookie.

9. The server as described in claim 7 further comprising:
   a primary name for the server; and
   an alternate name for the server;
   wherein the first identifier includes the primary name, and wherein the second identifier includes the alternate name.

10. The server as described in claim 7 wherein the resources include one or more files.

11. A computer program product for handling client state information, said computer program product comprising:

means for analyzing a web page, the web page including one or more hyperlinks, wherein each hyperlink includes a server identifier and a resource identifier;

means for determining whether the resource identifier corresponds to a server resource that uses client state information; and means for setting the server identifier to a second server identifier in response to determining that the server resource does not require client state information;

means for storing the resources and the web page with the reset server identifiers on a server, wherein the server identifier and second server identifier each identify the server;

wherein the means for analyzing, determining, setting, and storing are each performed prior to receiving a first request from a client computer;

means for receiving the first request from the client computer for the web page;

means for retrieving the stored web page that includes the reset server identifiers; and means for transmitting the retrieved web page to the client computer.

12. The computer program product as described in claim 11 further comprising:

means for setting the server identifier to a first server identifier in response to determining that the resource uses client state information.

13. The computer program product as described in claim 11 wherein the client state information includes an Internet cookie.

14. The computer program product as described in claim 11 further comprising:

means for creating an alternate name for a server, wherein the server hosts the resources; and wherein the second identifier includes the alias.

15. The computer program product as described in claim 14 wherein the server identifier includes a primary name for a server.

16. The computer program product as described in claim 11 wherein the server resource includes one or more files.

* * * * *

UNITED STATES PATENT AND TRADEMARK OFFICE
CERTIFICATE OF CORRECTION

PATENT NO. : 6,848,000 B1
DATED : January 25, 2005
INVENTOR(S) : William Robert Reynolds It is certified that error appears in the above-identified patent and that said Letters Patent is hereby corrected as shown below:

Column 4,
Line 13, please delete "in path g/" on" and insert -- in path "/" on --.

Column 12,
Line 30, please delete "server" and insert -- server; --

Signed and Sealed this

Tenth Day of May, 2005

JON W. DUDAS
*Director of the United States Patent and Trademark Office*